Sept. 8, 1931.  J. L. MONK  1,822,599
TESTING GAUGE
Filed Feb. 13, 1929  2 Sheets-Sheet 1
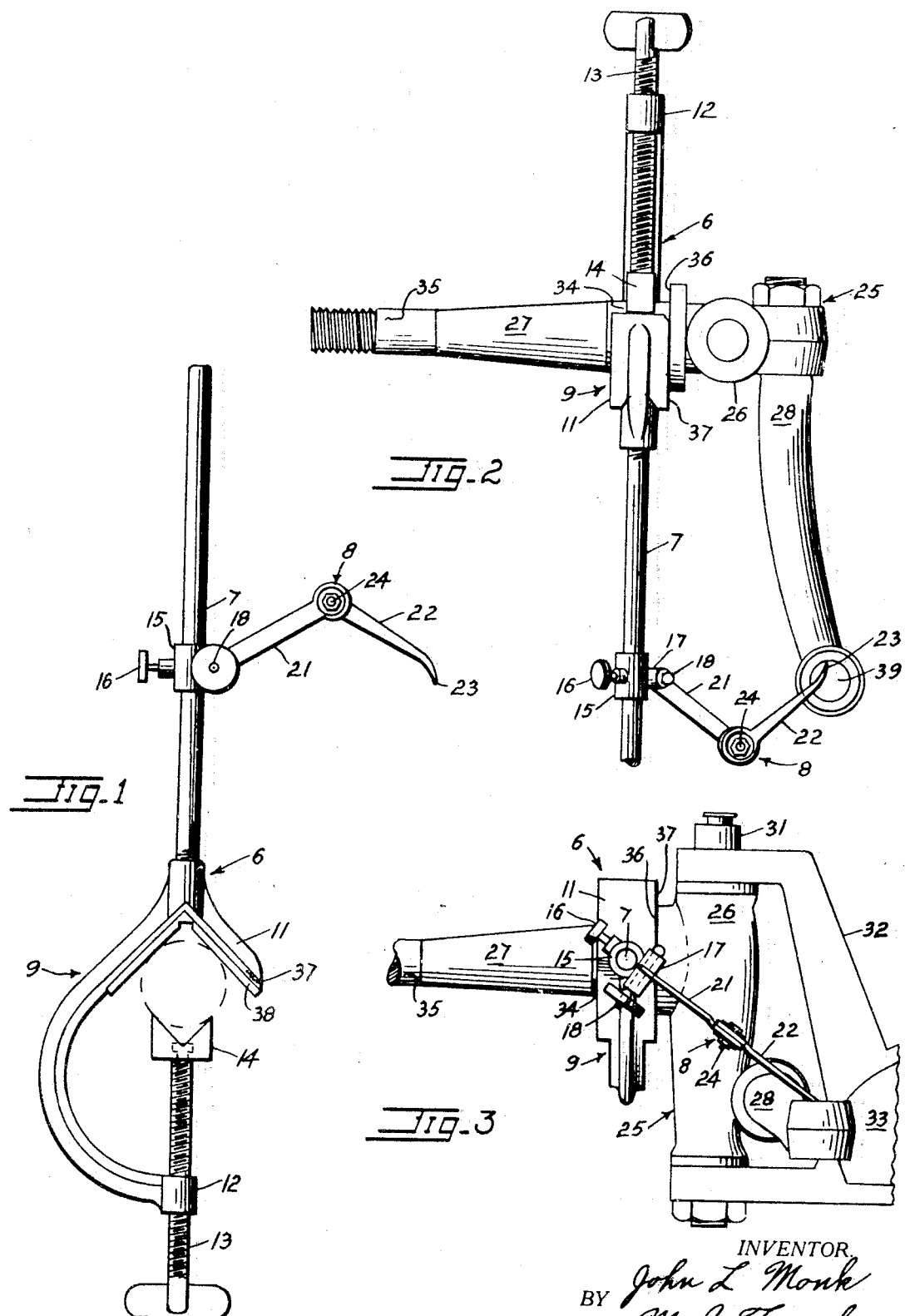
INVENTOR
John L Monk
BY M. C. Frank
ATTORNEY Sept. 8, 1931. J. L. MONK 1,822,599
TESTING GAUGE
Filed Feb. 13, 1929 2 Sheets-Sheet 2
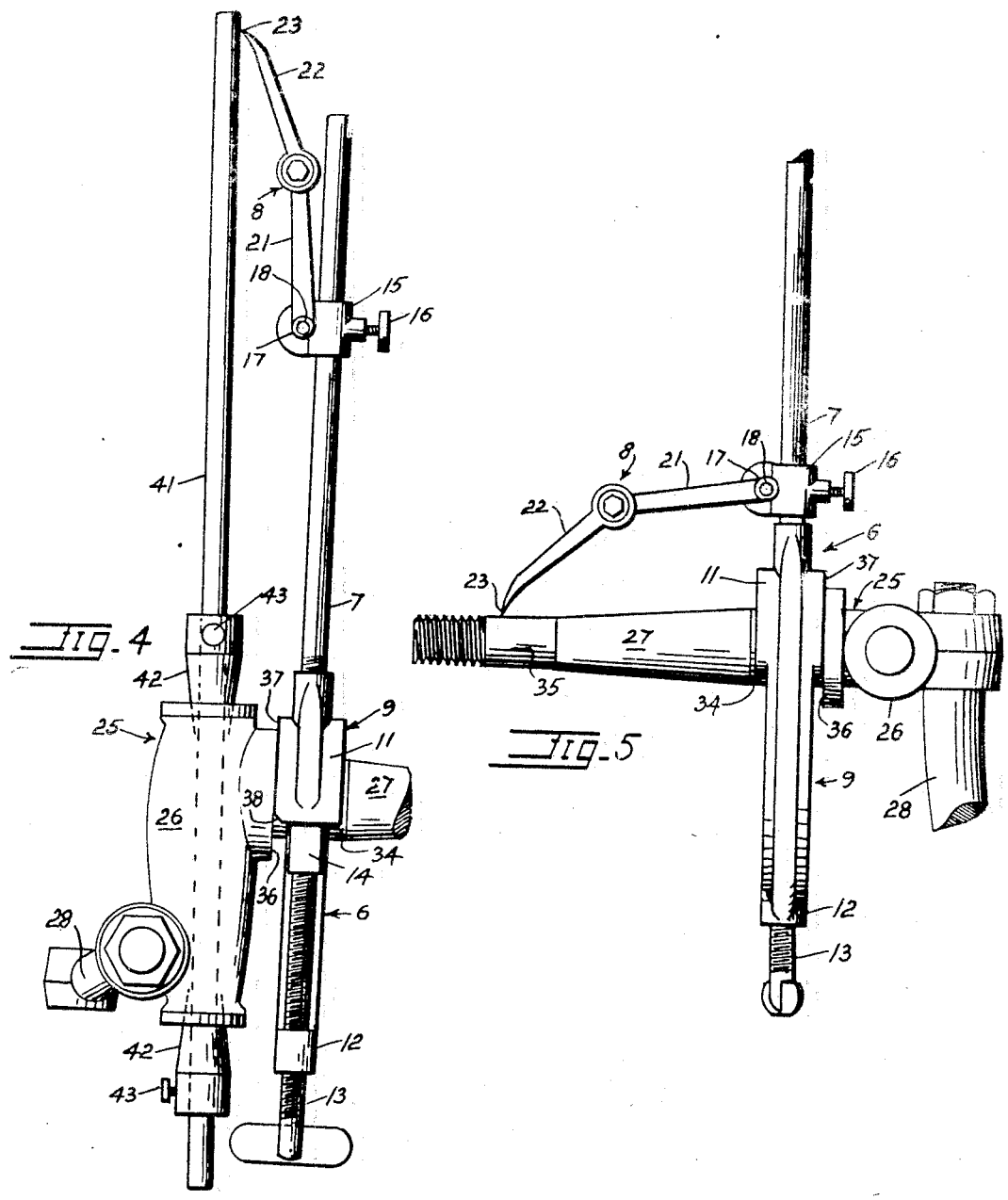
INVENTOR.
John L. Monk
BY M. C. Frank
ATTORNEY Patented Sept. 8, 1931

1,822,599

UNITED STATES PATENT OFFICE

JOHN L. MONK, OF OAKLAND, CALIFORNIA

TESTING GAUGE

Application filed February 13, 1929. Serial No. 339,554.

The invention relates to a gauge for testing the mutual relations of fixedly related parts of a mechanical structure with respect to a given part.

A general object of the invention is to provide a gauge of the class described which is arranged for mounting on a cylindrical element permanently or temporarily associated with a structure to be tested.

A more specific object is to provide a gauge of the character described which is particularly designed for testing the relation of the spindle of a front wheel steering knuckle assembly to various other elements of the assembly.

Another object of the invention is to provide a device for testing the relation of a steering arm of a steering knuckle assembly to the spindle of the assembly.

A further object is to provide a device for testing the angular and other relations of the axis of the spindle and the pivotal axis of the steering knuckle assembly.

Yet another object is to provide a gauge for checking a spindle having spaced bearing portions as to the coaxial relation of said portions.

The invention possesses other objects and features of advantage, some of which, with the foregoing, will be set forth in the following description of a preferred form of the invention which is illustrated in the accompanying drawings, in which:

Figure 1 is a side view of the gauge.

Figure 2 is a plan view showing the gauge operatively associated with the steering knuckle assembly of a left front vehicle wheel for ascertaining the relation of the pin bushing of the steering arm of the assembly to the spindle thereof.

Figure 3 is a vertical elevation of the showing of Figure 2, taken generally end-on with respect to the spindle arm, the associated end of an axle carrying the assembly being included in the view.

Figure 4 discloses the gauge in use for checking the angle between the spindle axis and that of the spindle body, an auxiliary test rod being disclosed in this view.

Figure 5 is a view of the gauge as disposed on the spindle for testing the straightness thereof.

As herewith particularly disclosed, the gauge 6 of my invention comprises a supporting rod 7, a test arm 8 mounted on the rod 7 for adjustment both longitudinally and angularly with respect thereto, and a clamp 9 carrying the rod 7. Preferably, and as shown, the clamp 9 comprises a C-shaped body providing a fixed V-block portion 11 at one end and a boss 12 at the other end. A thumb-bolt 13 is threadedly engaged through the boss 12 and carries at its inner end a V-block 14, said block being swivelled to the bolt. The V-grooves of the blocks 11 and 14 are in opposed relation whereby they may cooperatively embrace a cylindrical object for engaging the same in centered relation between them. As shown, the rod 7 is cylindrical and is threadedly engaged in the block 11 in such relation thereto that its axis will always lie in intersecting relation with the axis of a cylindrical object engaged between the clamp blocks, without regard to the diameter of the object.

The arm 8, it is noted, is carried on a sleeve 15 rotatably and slidably mounted on the rod 7, and is arranged to be secured in any desired position on the rod by means of a set-screw 16 engaged therethrough. Formed on the sleeve 15 is an arm supporting bracket 17, said bracket being cylindrical and generally tangential to the sleeve with its axis perpendicular to the sleeve axis. A transverse slot is provided in the bracket 17, said slot being coplaner with the sleeve axis and extending outwardly from the sleeve for the reception of the inner end of the arm 8. The portions of the bracket at opposite sides of the arm-receiving slot are arranged to be sprung together for releasably clamping the engaged arm end between, and a lock-bolt 18 is accordingly provided for this purpose: as shown, the bolt 18 extends through and between said bracket portions and through the arm end engaged thereby. In this manner, the arm 8 is hingedly secured to the sleeve 15 for pivotal movement in planes always including the rod axis and may be releasably fixed in any desired set position along and with respect to the rod.

Preferably, and as shown, the arm 8 comprises a pair of inner and outer flat members 21 and 22 pivoted together at their juncture, and offset adjacent said juncture whereby their extremities are coplanar. The outer member 22 is provided with a distinct point 23. The arm members 21 and 22 are so secured at their juncture, as by a bolt 24, that they are frictionally held in any desired angular relation, and yet may have said relation changed without involving any manipulation of the bolt 24.

As is previously indicated, the present gauge is particularly designed for checking the trueness of the relations existing between the various elements of a steering knuckle assembly 25 for a vehicle wheel (not shown). The assembly shown is intended as typifying the entire class of such assemblies, and comprises a spindle body 26, a spindle 27 providing a mounting for a vehicle wheel, and an arm 28 for connection to the vehicle steering gear (not shown), said arm being variously known as a steering arm or spindle arm. As is usual, the body 26 and spindle 27 are integrally associated and transversely related, and the body 26 is provided with a longitudinal bore for the reception of a bolt 31 for pivotally securing the body to and between the ends of a yoke 32 provided at the end of an axle 33, said axle being shown only in Figure 3.

In mounting a dirigible wheel on the fixed axle of a vehicle such as an automobile, there is one best relation of the wheel to the axle, and the proper relation of the parts of the steering knuckle assembly is predetermined therefor as a matter of design. Corresponding parts may, however, differ in their conformations so that assemblies of presumably like parts may not themselves be alike. Furthermore, collisions or other shocks may alter the relations of a given assembly. It is therefore desirable that a ready and accurate means be provided for checking such an assembly with respect to another and correctly proportioned assembly, and the manner of using the present gauge for such checking will now be described.

As is usual, the spindle 27 of the steering knuckle assembly shown is provided with spaced and coaxial inner and outer cylindrical bearing portions 34 and 35 for engagement in the inner and outer bearings of a wheel (not shown), the inner bearing portion 34 terminating at an annular face 36 against which the inner end of the inner bearing also engages. The structure and relations are substantially universal, differing only in the diameters and spacing of the bearings, and since the axis of the spindle and the bearing face at the inner end thereof are fixedly related, the spindle is the logical element of the assembly from which to check the other parts, it being obvious that the actual shapes of all other parts may vary considerably for a given assembly. Since the face 36 is a reference point, an end face 37 of the clamp block 11 is machined to a plane surface exactly perpendicular to the mutually parallel centering axis of the clamp blocks 14 and 11 whereby the face 37 may be disposed flat against the face 36. As the angle at the juncture of the bearing 34 and face 36 is usually not sharply defined, the edges defined at the intersection of the face 37 and the faces of the block 11 defining the V-groove thereof, are rounded off or bevelled, as shown at 38, thus insuring the desired engagement of the faces 36 and 37 and a definite disposal of the clamp on the spindle.

The steering arm 28, it will now be noted, extends generally radially from the body 26 and terminates in an eye 39 for receiving a clevis pin (not shown) for attaching the arm to a steering rod of a steering gear (not shown). The eye 39 is one of those elements of the assembly shown which must be disposed in a precise and predetermined relation to the spindle. For determining the actual relation of these parts, the gauge 6 is mounted on the spindle with the spindle face 36 abutting the clamp face 37 and clamped to the spindle with the rod so disposed that the point 23 of the arm 8 may engage some point of the eye 39, preferably a point in its pin-receiving bore. The aforesaid mounting of the gauge on the spindle is particularly disclosed in Figures 2 and 3, it being noted that the rod is disposed substantially perpendicularly to the axes of both the spindle and spindle body. With the various gauge parts locked in their set positions, the gauge is removed and mounted on a second like assembly (not shown) for comparison purposes whereby any difference in the assemblies is detected, and a guide, for correction of the erroneous one is provided.

The foregoing type of test, it is noted, may be varied as to the exact relations tested and the adjustability of the arm being compared, the adjustability of the arm being such as to permit the same to a maximum degree. In this manner, the one gauge permits as complete a test as may be desired. Referring to Figure 3, it is seen that the aforesaid test may be readily performed while the steering knuckle assembly is mounted on the axle 33. Furthermore, the pin and other connections for the eye 39 might remain in place while testing, the center line of the pin being then a satisfactory test point.

Another valuable application of the gauge is its use in testing the angular relation of the axes of the spindle body bore and the spindle. Said axes are desirably coplanar and usually define an acute angle of about 87 degrees. Referring to Figure 4, it is seen that a test bar 41 is used in connection with the gauge 6 for making the aforesaid test.

The bar 41 is somewhat smaller than the spindle body bore, and slidably carries conically tapered sleeves 42 for engagement in opposite ends of said bore for centering the bar 41 therein, set screws 43 being provided on the sleeves 42 for fixing them to the bar when the latter is centered. With the gauge mounted on the spindle as before and the longitudinal axis of the gauge rod 7 in coplanar relation with the longitudinal axis of said bar, the gauge arm point may be disposed at or adjacent the bar. The gauge would then be applied in a corresponding manner to a second like assembly for comparison, as before. It is noted that the specific form of the bar 41 and its mounting form no part of the present invention and that said bar is used primarily to magnify any difference from standard as to the angle between the body bore and spindle axes; in other words, the operation performed with the aid of the bar 41 might be performed without it, but with very much less accuracy. In the latter case, the gauge point 23 would be applied directly to the bearing bore of the body at an end thereof. On the other hand, the bar 41 might be used as a mounting for the gauge in effecting this and other desired tests.

A further notable use of the present gauge is its application for determining the straightness of the spindle. For this purpose, the gauge would be mounted on the spindle as before and the point 23 of the test arm 8 would be disposed adjacent or against the bearing 35, as is shown in Figure 5. In this instance, the engagement of the clamp 9 with the spindle bearing 34 would be such as to permit a fixedly centered rotation of the clamp about said bearing. Obviously, if the two bearings 34 and 35 are coaxial, the point 23 would maintain an unvarying relation to the bearing 35. The device would be similarly used if a brake shoe were included in the steering knuckle assembly, as is a common practice.

Since the device is also usable for tests of other assemblies including a cylindrical element, as a pulley mounted on a shaft, the provision of the C-clamp mounting therefor is seen to facilitate such use. Furthermore, the gauge is applicable for comparing similar assemblies which are right-hand and left-hand, as the two front wheel spindle assemblies of a vehicle, a given setting of the gauge arm 8 being the same for both, and the device being applicable to either without changing the setting.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a gauge of the class described, a rod, an arm hingedly and adjustably carried on said rod for movement solely in planes including the axis of said rod, and means for releasably mounting said rod on a cylindrical element for maintaining a fixed angular relation of the rod axis to the axis of said element.

2. A gauge for testing the relations of fixedly related elements of a front wheel steering knuckle structure, comprising a rod, a sleeve adjustable on said rod, an arm hingedly mounted on said sleeve for movement solely in a plane including the rod axis, and means for releasably mounting said rod on the spindle of the structure for adjustment about the axis of the spindle in fixed angular relation thereto.

In testimony whereof, I affix my signature.

JOHN L. MONK.